United States Patent [19]

Uemura

[11] 4,037,193
[45] July 19, 1977

[54] LIQUID LEVEL ALARM APPARATUS FOR A TANK OF A VEHICLE

[75] Inventor: Hiroshi Uemura, Toyota, Japan

[73] Assignee: Toyota Jidosha Kogyo Kabushiki Kaisha, Toyota, Japan

[21] Appl. No.: 610,239

[22] Filed: Sept. 4, 1975

Related U.S. Application Data

[63] Continuation of Ser. No. 420,059, Nov. 29, 1973, abandoned.

[30] Foreign Application Priority Data

July 24, 1973 Japan .................................. 48-82663

[51] Int. Cl.² .............................................. B60T 17/22
[52] U.S. Cl. .................................. 340/59; 200/84 C; 340/244 E
[58] Field of Search .......... 340/59, 60, 244 A, 244 E; 200/84 C; 73/308, 313; 60/535

[56] References Cited

U.S. PATENT DOCUMENTS

| | | | |
|---|---|---|---|
| 3,351,084 | 11/1967 | Halkiades | 73/308 |
| 3,437,771 | 4/1969 | Nusbaum | 200/84 C |
| 3,633,193 | 1/1972 | Milo | 340/244 A |
| 3,654,956 | 4/1972 | Tsubouchi | 137/558 |
| 3,659,064 | 4/1972 | Inoue | 200/84 C |
| 3,750,124 | 9/1971 | Barnes et al. | 340/244 E |
| 3,751,614 | 8/1973 | Jones | 200/84 C |
| 3,805,230 | 4/1974 | Sakasegawa et al. | 340/59 |
| 3,978,299 | 8/1976 | Takai | 200/84 C |

Primary Examiner—John W. Caldwell
Assistant Examiner—Joseph E. Nowicki
Attorney, Agent, or Firm—Kenyon & Kenyon

[57] ABSTRACT

A liquid level alarm apparatus for a tank of a vehicle comprising a float having a permanent magnet, a pair of electrical contacts opened or closed in response to the proximity of said magnet, and a stopper for limiting the upward movement of the float, said contacts being connected by leads to an electric circuit comprising an alarm device. The contacts are maintained in a closed condition when the liquid in the tank is above a predetermined level and the contacts are separated, which operates the alarm of the alarm device, when the liquid in the tank is below the predetermined level.

3 Claims, 2 Drawing Figures

LIQUID LEVEL ALARM APPARATUS FOR A TANK OF A VEHICLE

This is a continuation of application Ser. No. 420,059 filed Nov. 29, 1973 and subsequently abandoned.

This invention relates to an alarm device which indicates the liquid level of water in a radiator, oil in an oil tank or gasoline in a fuel tank, of a vehicle, and which operates when the level of the liquid is below a predetermined level to warn, for example, the driver of the vehicle, by an alarm lamp or an alarm buzzer.

Known devices of this kind employ various level switches for detection of the liquid level. In a typical construction, a float with at least one magnet floats on the liquid surface and is moved upwardly or downwardly according to the displacement of the liquid level, whereby the magnet of the float is moved toward or away from a switch contact portion of a reed relay. As a result of this, said switch is opened or closed by the magnetic force of the magnet and directly causes and alarm, such as a lamp or buzzer, to operate. In these known devices, the switch of the reed relay is maintained in the open position during normal conditiona, i.e., when the liquid level is over a predetermined level. However, if the liquid level becomes less than the predetermined level, the switch is changed to the closed position by the magnet, thus causing electric current to flow into the alarm and operate it. These known apparatuses, however, have major drawbacks. That is, if the reed relay is jolted by vibration during driving, or in starting or stopping, even though the level of the liquid may be above the predetermined level, the switch contacts may be jolted into mutual contact, causing false operation of the alarm device. Also, the reverse situation may arise, namely, that the gap between the contacts may be widened beyond its preset condition, with the result that the contacts cannot close even when the level of the liquid is below the predetermined level, so that the alarm device fails to operate. Further, since, as explained above, during normal conditions the switch circuit is always maintained in an open state, if the connection between the switch and the alarm device should be broken for any reason, not only can this fact not be detected, but moreover, the alarm device cannot operate even though the level of the liquid may be below the predetermine level.

An object of this invention is to overcome these drawbacks and provide a liquid level alarm apparatus which operates reliably.

Another object of this invention is to provide a liquid level alarm apparatus capable of giving warning of breakage of the electrical connection.

This invention will be explained in detain with reference to the appended drawings in which.

Though the drawings illustrate one embodiment of the present invention, the invention is of course not limited to this embodiment.

Figure 1:
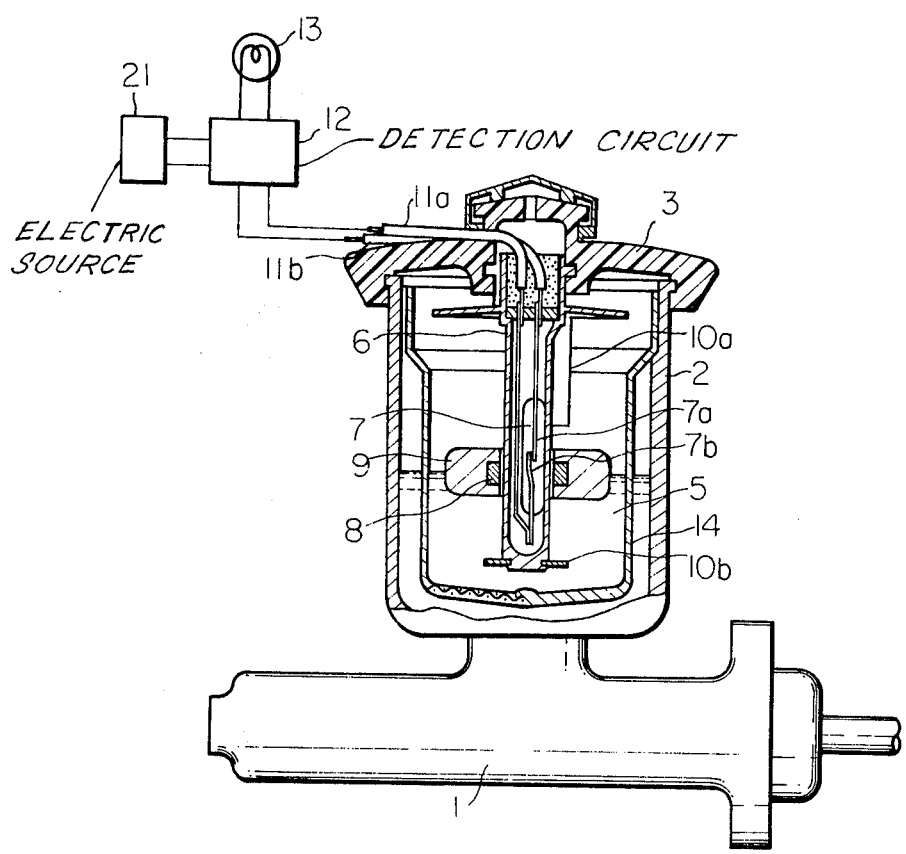
FIG. 1 shows a side view, partially shown in section, of a liquid level alarm apparatus according to the invention.

In FIG. 1, 2 is a reserve tank connected to a brake master cylinder 1. Brake fluid 5 is poured into said tank 2 through the upper end opening of the tank, which is closed by a removable cap 3. A strainer 14 is preferably provided within the tank 2 around its inner periphery. By means of this, if dust or other foreign bodies are present in the tank, they are prevented from entering the master cylinder 1, and hence the brake systm (not shown). A preferably cylindrical case 6 with reed switch 7 therein, is also positioned inside tank 2. The interior of the case 6 is isolated from the liquid, and the upper end of the case 6 is supported by the cap 3. The case 6 extends downwardly to act as a guide for a float 9. Reed switch 7 in said case 6 may be a conventional type and has contacts 7a and 7b. The two contacts 7a, 7b ar connected by respective leads 11a, 11b to a detection ciruit arrangement 12, according to the present invention, outside the tank. As will be explained, the detection circuit 12 causes an alarm 13, such as a lamp or buzzer or the like, to be turned on or off in response to the breaking or making respectively, of the connection between the contacts 7a and 7b.

The float 9 is preferably cylindrical, having a central hole, a permanent magnet 8 being fixed to at least the inner circumference thereof, and floats on the liquid surface, fitting over the outside of case 6. Although the float 9 is substantially guided by the outer periphery of the case 6 in its upward and downward movements, in accordance with changes of the level of the liquid, the inner circumference of the float is free with respect to the outside of the case 6. In order to limit the upward and downward movements of the float 9, two stoppers 10a, 10b are provided on the case 6. That is, upper stopper 10a defines the upper limit of movement of the float 9, and lower stopper 10b defines the lower limit of movement of the float 9.

Although the stoppers 10a and 10b can be both optionally arranged to some extent with respect to the height of the predetermined level, it is necessary to place the upper stopper 10a in such a way that when the float 9 is in contact with it, the connection between the contacts 7a and 7b is maintained, that is, the alarm device is not operated. In other words, because the contact between the two contacts 7a and 7b is induced by the magnetic force of the magnet 8 fixed to the float 9, as will be explained later, the position of the float when in contact with the stopper 10a must such that the magnetic force of the magnet 8 continues to keep the contacts 7a and 7b closed.

The lower stopper 10b is removably mounted to the lower portion of the case 6 and is useful for preventing the float 9 from falling off the case 6 even when the liquid in the tank is little or empty. However the stopper 10b may also be dispensed with. the case of providing the lower stopper 10b, the lower stopper is positioned at such a point that if the float should come into contact with it the brake liquid in the tank is immediately below the predetermined level.

The circuit formed by the reed switch 7, the alarm 13, the electric source 21, and the detection circuit 12 is so arranged, in accordance with a feature of this invention, that the connection between the two contacts 7a and 7b is made that is, the alarm 13 is not operated, when the brake liquid within the tank is above the predetermined level (as it is normally). This will be explained by reference to FIG. 2, which illustrates an embodiment of the detection circuit for carrying out this invention.

Figure 2:
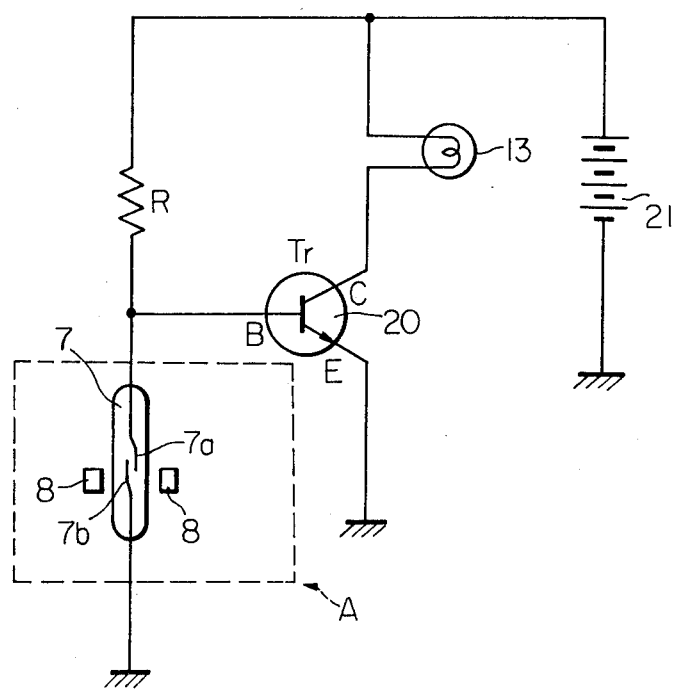
FIG. 2 shows one example of a detecting circuit to operate the apparatus shown in FIG. 1.

In FIG. 2, the chain line "A" represents the interior of the reserve tank 2. Referring to both FIGS. 1 and 2, if the level of the brake fluid 5 is higher than the predetermined level the float 9, and therefore the magnet 8, will be in the vicinity of the contacts 7a and 7b, and the magnetic force of the magnet 8 will close the two contacts. When the reed switch 7 is closed, the base (B)

of transistor 20 is at earth potential and said transistor is in the "off" state. That is, the connection between the collector (C) and emitter (E) of transistor 20 is open, and the alarm 13 is not on. When the brake fluid falls below the predetermined level, the float 9 moves away from the reed switch 7 and the reed switch 7 is no longer subjected to the influence of the permanent magnet 8 of the float. As a result of this, contacts 7a, 7b separate and the reed switch 7 changes to its "open" state. The potential of the base (B) of transistor 20 now rises to the electric source potential, and said transistor is turned on. That is, the connection between the collector (C) and the emitter (E) becomes conductive, and the alarm is operated to alert the driver that the brake fluid level is low. The usual vehicle battery can be used as the electric source 21.

The contacts 7a and 7b are, of course, always maintained in closed position by the magnet force of the magnet 8, in spite of shock or vibration when the vehicle is in motion, as long as the float 9 is positioned within the limit in which the magnet 8 of the float 9 can exert its magnetic influence upon the two contacts to make the connection therebetween.

As will now be clear from the above, since the liquid level alarm apparatus according to the present invention is so constructed that the reed switch is closed when the liquid level is above its predetermines level, and, conversely, when the liquid level is below its predetermined level, the reed switch is in its open state, the drawbacks of the conventional apparatus are avoided. That is, false operation of the alarm device, due to shock or vibration during operation of the vehicle, can be avoided. Furthermore, if the circuit leading from the reed switch to the alarm device should be broken, this fact can be detected, since in this case the alarm device operates. Whether the operation of the alarm is due to an insufficient quantity of liquid or to a break in the circuit can be easily ascertained by checking the quantity of liquid.

Although the invention has been described with reference to a brake fluid reserve tank it can of course be applied in many other cases, such as for example, a vehicle radiator, or a fuel tank.

What is claimed is:

1. A liquid low level alarm apparatus for a vehicle tank of the type that includes a buoyant member for floating on the liquid in the tank, a permanent magnet carried by the buoyant member, a reed switch positioned vertically in the tank at a predetermined level and having a pair of contacts movable from a first position to a second position in response to proximity of the magnet, an elongated upright case enclosing the switch, the buoyant member slidably engaging the case for guidance thereby in free up and down movement in response to changes of liquid level in the tank, upper and lower stops fixed to the case for limiting the upward and downward movement of the buoyant member to a range that includes a predetermined minimum liquid level, an electric source, and an alarm connected in circuit with the switch and the electric source for actuation when the switch contacts are in a preselected one of the first and second positions, wherein the improvement comprises:

the case and buoyant member being attached to a removable cap for the tank to permit easy removal whenever the tank is refilled;

the reed switch and the stops being positioned relative to the predetermined minimum liquid level such that the contacts are closed when the liquid in the tank is above said level and the contacts are open when the liquid in the tank is below said level, and a detection circuit connected to the switch, the electrical source, and the alarm for causing the alarm to operate when the switch contacts are open.

2. A liquid low level alarm apparatus for a vehicle tank of the type that includes a buoyant member in the tank, a permanent magnet carried by the buoyant member, a reed switch positioned vertically in the tank at a predetermined level and having a pair of contacts movable from an open position to a closed position in response to proximity of the magnet carried by the buoyant member, an elongated upright case enclosing the switch, the buoyant member slidably engaging the case for guidance thereby in free up and down movement in response to changes of liquid level in the tank, an electric source, and an alarm connected in circuit with the switch and the electric source for actuation when the switch contacts are in a preselected one of the open and closed positions, wherein the improvement comprises:

the reed switch being positioned at a level in the tank such that when the liquid falls to a predetermined minimum level, the buoyant member floats just below the lowest point at which the magnet will maintain the switch contacts in the closed position, an upper stop fixed to the case for limiting the upward travel of the float to a level at which the magnet will maintain the switch contacts in the closed position, and a detection circuit connected to the switch, the electric source, and the alarm for actuating the alarm when the switch contacts are in the open position.

3. The liquid level alarm apparatus of claim 2 further comprising:

a removable snap cover having tongue and groove interengagement with the tank, the elongated case depending from the cover and extending downward to a point above the bottom of the tank, at least one flexible conductive wire to provide the connection from the switch to the electric source and alarm, and a lower stop removably fastened to the lower end of the case for limiting the downward movement of the buoyant member to a point below the predetermined minimum level whereby the cover, switch case, and buoyant member to be removed as a unit to facilitate refilling the tank with liquid.

* * * * *

UNITED STATES PATENT AND TRADEMARK OFFICE
CERTIFICATE OF CORRECTION

PATENT NO. : 4,037,193
DATED : July 19, 1977
INVENTOR(S) : Hiroshi Uemura

It is certified that error appears in the above-identified patent and that said Letters Patent are hereby corrected as shown below:

Col. 1, line 23, correct spelling of "conditions".

Col. 1, line 46, change "predetermine" to --predetermined--.

Col. 1, line 53, change "detain" to --detail--.

Col. 2, line 2, correct spelling of "system".

Col. 2, line 10, correct spelling of "are".

Col. 2, line 48, before "the" insert --In--.

Col. 3, line 27, correct spelling of "predetermined".

Col. 3, line 36, after "alarm" insert --device--.

Col. 4, line 56, after "level" insert a --,--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*